United States Patent
Kurose et al.

(10) Patent No.: US 12,474,704 B2
(45) Date of Patent: Nov. 18, 2025

(54) ROBOT CONTROL MODEL LEARNING METHOD FOR REDUCING FREQUENCY OF ROBOT INTERVENTION BEHAVIOR

(71) Applicant: OMRON CORPORATION, Kyoto (JP)

(72) Inventors: Mai Kurose, Tokyo (JP); Ryo Yonetani, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 268 days.

(21) Appl. No.: 17/774,604

(22) PCT Filed: Oct. 21, 2020

(86) PCT No.: PCT/JP2020/039554
§ 371 (c)(1),
(2) Date: May 5, 2022

(87) PCT Pub. No.: WO2021/095464
PCT Pub. Date: May 20, 2021

(65) Prior Publication Data
US 2022/0397900 A1 Dec. 15, 2022

(30) Foreign Application Priority Data
Nov. 13, 2019 (JP) .................................. 2019-205690

(51) Int. Cl.
G05D 1/00 (2024.01)
(52) U.S. Cl.
CPC ......... *G05D 1/0088* (2013.01); *G05D 1/0214* (2013.01)

(58) Field of Classification Search
CPC .. G05D 1/0088; G05D 1/0214; G05D 1/0246; G05D 1/0221; G06N 3/006; G06N 20/00; G06N 7/01; G01C 21/005
See application file for complete search history.

(56) References Cited

U.S. PATENT DOCUMENTS 10,872,379 B1 * 12/2020 Nepomuceno ....... G08G 1/0129
11,199,853 B1 * 12/2021 Afrouzi ................. B25J 13/006
(Continued)

FOREIGN PATENT DOCUMENTS

CN 103901887 A 7/2014
CN 107440891 A 12/2017
(Continued)

OTHER PUBLICATIONS

Sasaki et al., A3C Based Motion Learning for an Autonomous Mobile Robot in Crowds (Year: 2019).*
(Continued)

*Primary Examiner* — James J Lee
*Assistant Examiner* — Alexander George Matta
(74) *Attorney, Agent, or Firm* — Morgan, Lewis & Bockius LLP

(57) ABSTRACT

A robot control model learning device (10) performs, by using state information indicating the state of a robot which autonomously travels to a destination in a dynamic environment as an input, reinforcement learning to obtain a robot control model for selecting and outputting a behavior in accordance with the state of the robot from among a plurality of behaviors including an intervention behavior for intervening in the environment, while using the number of times the intervention behavior has been performed as a minus reward.

20 Claims, 6 Drawing Sheets

(56) References Cited

U.S. PATENT DOCUMENTS

| | | | |
|---|---|---|---|
| 2010/0194593 A1* | 8/2010 | Mays | B60W 10/184 340/905 |
| 2011/0144850 A1 | 6/2011 | Jikihara | |
| 2013/0184980 A1* | 7/2013 | Ichikawa | G05D 1/02 701/301 |
| 2019/0072959 A1* | 3/2019 | Palanisamy | G06N 7/01 |
| 2019/0272558 A1 | 9/2019 | Suzuki et al. | |
| 2019/0310632 A1* | 10/2019 | Nakhaei Sarvedani | G05D 1/0088 |
| 2020/0069134 A1* | 3/2020 | Ebrahimi Afrouzi | A47L 9/0472 |
| 2020/0249674 A1* | 8/2020 | Dally | G05D 1/0221 |
| 2021/0171025 A1* | 6/2021 | Ishikawa | G06N 3/006 |

FOREIGN PATENT DOCUMENTS

| | | |
|---|---|---|
| CN | 109213148 A | 1/2019 |
| CN | 109828574 A | 5/2019 |
| JP | 2012-139798 A | 7/2012 |
| JP | 2012-187698 A | 10/2012 |
| JP | 2018-198012 A | 12/2018 |
| JP | 2019-096012 A | 6/2019 |
| WO | 2012/039280 A1 | 3/2012 |
| WO | 2018/110305 A1 | 6/2018 |

OTHER PUBLICATIONS

Extended European search report issued in corresponding International Application No. 20888239.9 dated Nov. 13, 2023.
Sasaki et al., "A3C Based Motion Learning for an Autonomous Mobile Robot in Crowds", 2019 IEEE International Conference on Systems, Man and Cybernetics (SMC), IEEE, Oct. 6-9, 2019, pp. 1036-1042, XP033667706.
Wang et al., "Improved Multi-Agent Reinforcement Learning for Path Planning-Based Crowd Simulation", IEEE Access, vol. 7, Jun. 19, 2019, pp. 73841-73855, XP011731208.
Chen et al., "Decentralized Non-communicating Multiagent Collision Avoidance with Deep Reinforcement Learning," https://arxiv.org/pdf/1609.07845 (2016).
Chen et al., "Socially Aware Motion Planning with Deep Reinforcement Learning," https://arxiv.org/pdf/1703.08862.pdf (2018).
ZMP https://news.mynavi.jp/article/20180323-604926/ (Mar. 23, 2018).
International Search Report issued in corresponding International Application No. PCT/JP2020/039554 dated Dec. 8, 2020.
Written Opinion of the International Searching Authority issued in corresponding International Application No. PCT/JP2020/039554 dated Dec. 8, 2020.
Office Action issued in corresponding Chinese Patent Application No. 202080076868.3, dated Nov. 12, 2024, with a partial English translation.

* cited by examiner

FIG.5     AT TIME OF LEARNING

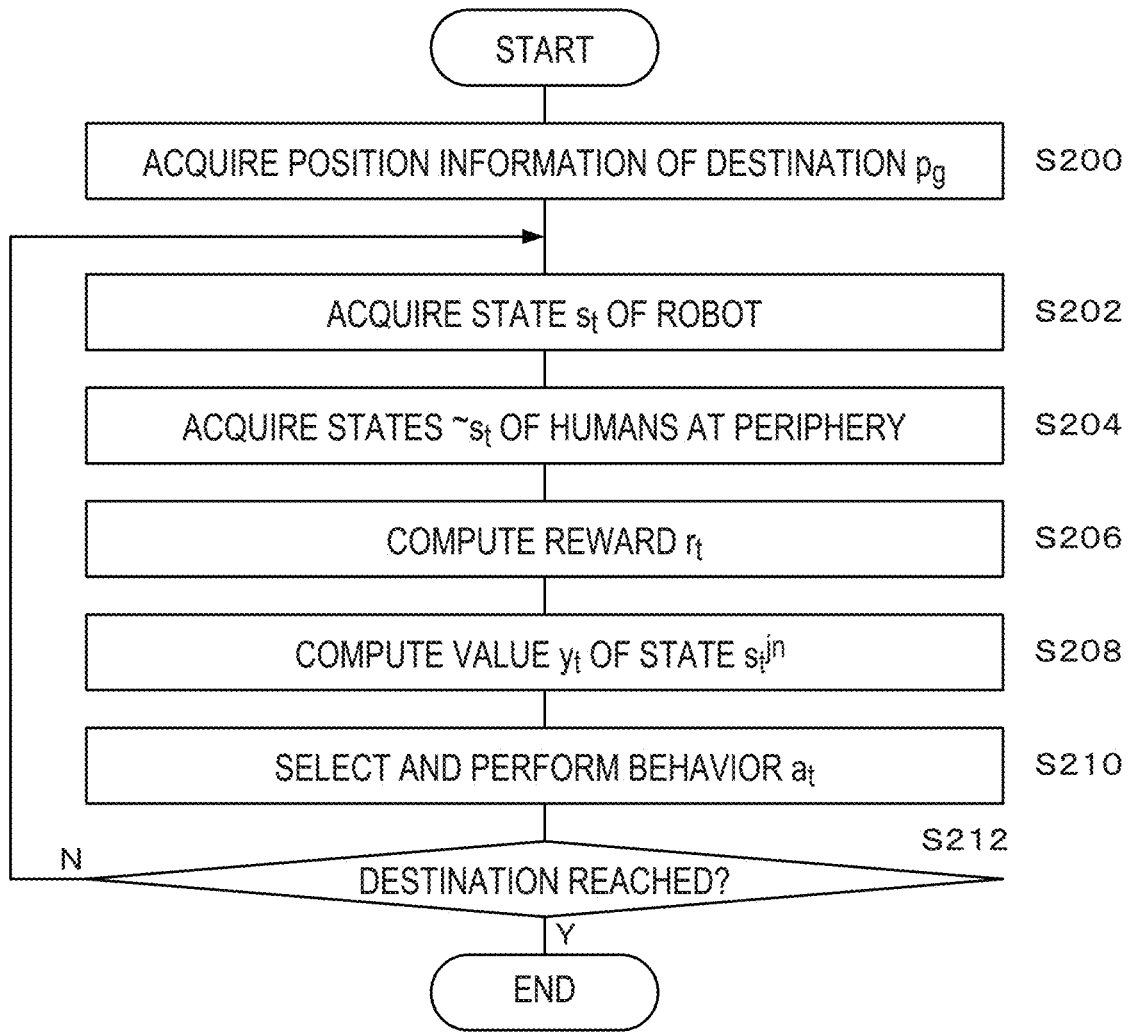

ROBOT CONTROL MODEL LEARNING METHOD FOR REDUCING FREQUENCY OF ROBOT INTERVENTION BEHAVIOR

TECHNICAL FIELD

The technique of the present disclosure relates to a robot control model learning method, a robot control model learning device, a robot control model learning program, a robot control method, a robot control device, a robot control program and a robot.

BACKGROUND ART

In path planning techniques that are exemplified by RRT (Rapidly-exploring Random Tree) and PRM (Probabilistic Road Map), a path from an initial position to a target position is derived by carrying out graph searching using respective geographical points in a sampled space as nodes.

The subjects of such techniques are static, known environments. In dynamic environments, "re-planning" must be carried out each time the environment changes.

Known "re-planning" techniques are based on updating the map in accordance with changes in the environment, and searching for another global path that can transform continuously. In a congested environment in which changes arise continuously such as in a crowd environment, a solution may not be found, and stoppage of the robot in the re-planning may occur frequently.

Further, in a complex environment such as a crowd or the like, obstacles right in front of the eyes are merely continued to be removed intermittently, and much stress is applied to the environment.

Non-Patent Document 1 (Decentralized Non-communicating Multiagent Collision Avoidance with Deep Reinforcement Learning https://arxiv.org/pdf/1609.07845) discloses a technique of acquiring a collision avoiding policy by deep reinforcement learning. In the technique disclosed in Non-Patent Document 1, a policy that minimizes the time until the destination is reached is acquired while avoiding collisions with agents at the periphery.

Non-Patent Document 2 (Socially Aware Motion Planning with Deep Reinforcement Learning https://arxiv.org/pdf/1703.08862.pdf) discloses a technique that improves on the technique disclosed in Non-Patent Document 1. In the technique disclosed in Non-Patent Document 2, natural avoidance behaviors are realized socially by adding social norms to a reward function in which features of collision avoidance behaviors of humans are taken into consideration.

Non-Patent Document 3 (ZMP https://news.mynavi.jp/article/20180323-604926/) discloses a technique in which a robot autonomously travels without changing the path plan of the robot itself, by carrying out intervention behaviors that work so as to yield the way to obstacles (humans) on the path plan.

SUMMARY OF INVENTION

Technical Problem

However, the techniques disclosed in above-described Non-Patent Documents 1, 2 both deal with only passive collision avoidance behaviors with respect to the environment, and neither deals with intervention behaviors.

Further, the techniques disclosed in above-described Non-Patent Documents 1, 2 assume interactions with a small number of agents, and interactions in crowd environments are not assumed.

Further, as in the technique disclosed in Non-Patent Document 3, although the implementing of an intervention by a simple policy is easy, a high frequency of interventions is a cause of stress at the environment side, and there are cases in which the transport efficiency of the pedestrian group at the periphery deteriorates.

The technique of the disclosure was made in view of the above-described points, and an object thereof is to provide a robot control model learning method, a robot control model learning device, a robot control model learning program, a robot control method, a robot control device, a robot control program and a robot that, in a case in which a robot is moved to a destination in a dynamic environment, can reduce the number of times of intervention behaviors in which the robot intervenes in the surrounding environment.

Solution to Problem

A first aspect of the disclosure is a robot control model learning method comprising: a learning step in which a computer reinforcement-learns a robot control model, whose input is state information expressing a state of a robot that travels autonomously to a destination in a dynamic environment, and that selects and outputs a behavior corresponding to the state of the robot from among a plurality of behaviors including an intervention behavior of intervening in the environment, with a number of times of intervention in which the intervention behavior is executed being a negative reward.

In the above-described first aspect, the behavior may include at least one of a moving direction of the robot, a moving velocity of the robot, and the intervention behavior, and the reward may be given such that at least one of an arrival time until the robot reaches the destination and the number of times of intervention decreases.

In the above-described first aspect, the behaviors may include an avoidance behavior in which the robot avoids a collision with another object, and the reward may be given such that a number of times of avoidance in which the collision is avoided decreases.

In the above-described first aspect, the learning step may reinforcement-learn by updating a state value function that expresses the state of the robot.

A second aspect of the disclosure is a robot control model learning device comprising: a learning section that reinforcement-learns a robot control model, whose input is state information expressing a state of a robot that travels autonomously to a destination in a dynamic environment, and that selects and outputs a behavior corresponding to the state of the robot from among a plurality of behaviors including an intervention behavior of intervening in the environment, with a number of times of intervention in which the intervention behavior is executed being a negative reward.

A third aspect of the disclosure is a robot control model learning program for causing a computer to execute processings comprising: a learning step of reinforcement-learning a robot control model, whose input is state information expressing a state of a robot that travels autonomously to a destination in a dynamic environment, and that selects and outputs a behavior corresponding to the state of the robot from among a plurality of behaviors including an intervention behavior of intervening in the environment, with a number of times of intervention in which the intervention behavior is executed being a negative reward.

A fourth aspect of the disclosure is a robot control method in which a computer executes processings comprising: an acquiring step of acquiring state information expressing a state of a robot that travels autonomously to a destination in a dynamic environment; and a control step of effecting control such that the robot moves to the destination, on the basis of the state information and a robot control model learned by a robot control model learning method.

A fifth aspect of the disclosure is a robot control device comprising: an acquiring section that acquires state information expressing a state of a robot that travels autonomously to a destination in a dynamic environment; and a control section that effects control such that the robot moves to the destination, on the basis of the state information and a robot control model learned by a robot control model learning device.

A sixth aspect of the disclosure is a robot control program for causing a computer to execute processings comprising: an acquiring step of acquiring state information expressing a state of a robot that travels autonomously to a destination in a dynamic environment; and a control step of effecting control such that the robot moves to the destination, on the basis of the state information and a robot control model learned by a robot control model learning method.

A seventh aspect of the disclosure is a robot comprising: an acquiring section that acquires state information expressing a state of the robot that travels autonomously to a destination in a dynamic environment; an autonomous traveling section that causes the robot to travel autonomously; and a robot control device that includes a control section effecting control such that the robot moves to the destination on the basis of the state information and a robot control model learned by a robot control model learning device.

Advantageous Effects of Invention

In accordance with the technique of the disclosure, in a case in which a robot is moved to a destination in a dynamic environment, the number of times of intervention behaviors, in which the robot intervenes in the surrounding environment, can be reduced.

BRIEF DESCRIPTION OF DRAWINGS

FIG. 8 is a flowchart illustrating the flow of robot controlling processing by the robot control device.

DESCRIPTION OF EMBODIMENTS

Figure 1:
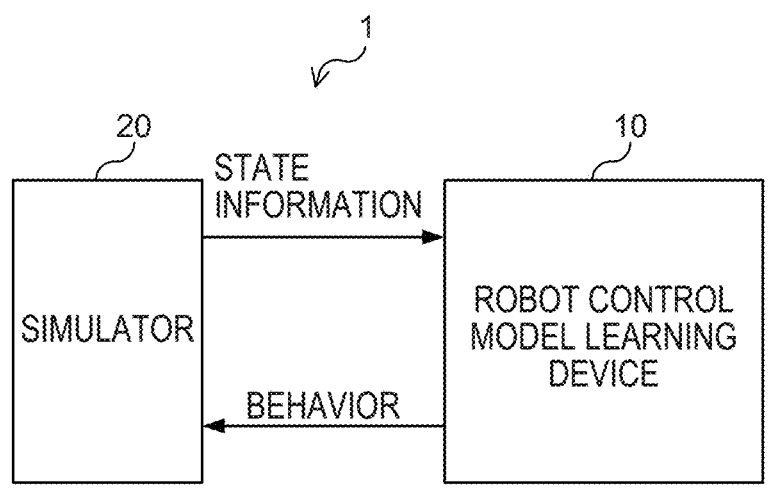
FIG. 1 is a drawing illustrating the schematic structure of a robot control model learning system.

Examples of embodiments of the technique of the disclosure are described hereinafter with reference to the drawings. Note that structural elements and portions that are the same or equivalent are denoted by the same reference numerals in the respective drawings. Further, there are cases in which the dimensional proportions in the drawings are exaggerated for convenience of explanation, and they may differ from actual proportions.

FIG. 1 is a drawing illustrating the schematic structure of a robot control model learning system 1.

As illustrated in FIG. 1, the robot control model learning system 1 has a robot control model learning device 10 and a simulator 20. The simulator 20 is described later.

The robot control model learning device 10 is described next.

Figure 2:
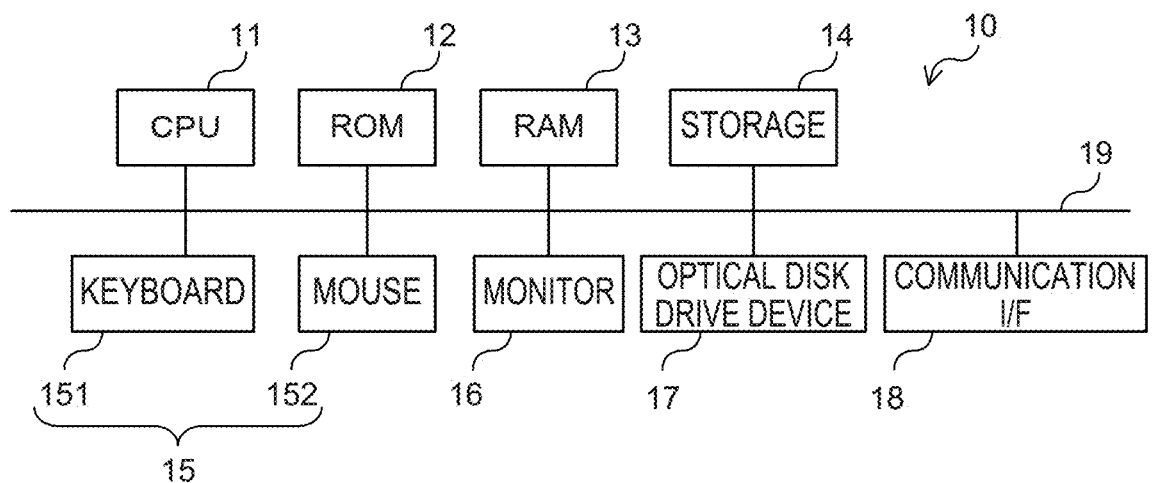
FIG. 2 is a block drawing illustrating hardware structures of a robot control model learning device.

FIG. 2 is a block drawing illustrating hardware structures of the robot control model learning device 10.

As illustrated in FIG. 2, the robot control model learning device 10 has a CPU (Central Processing Unit) 11, a ROM (Read Only Memory) 12, a RAM (Random Access Memory) 13, a storage 14, an input portion 15, a monitor 16, an optical disk drive device 17 and a communication interface 18. These respective structures are connected so as to be able to communicate with one another via a bus 19.

In the present embodiment, a robot control model learning program is stored in the storage 14. The CPU 11 is a central computing processing unit, and executes various programs and controls the respective structures. Namely, the CPU 11 reads-out a program from the storage 14, and executes the program by using the RAM 13 as a workspace. The CPU 11 caries out control of the above-described respective structures, and various computing processings, in accordance with the programs recorded in the storage 14.

The ROM 12 stores various programs and various data. The RAM 13 temporarily stores programs and data as a workspace. The storage 14 is structured by an HDD (Hard Disk Drive) or an SSD (Solid State Drive), and stores various programs, including the operating system, and various data.

The input portion 15 includes a keyboard 151 and a pointing device such as a mouse 152 or the like, and is used in order to carry out various types of input. The monitor 16 is a liquid crystal display for example, and displays various information. The monitor 16 may function as the input portion 15 by employing a touch panel type therefor. The optical disk drive device 17 reads-in data that is stored on various recording media (a CD-ROM or a flexible disk or the like), and writes data to recording media, and the like.

The communication interface 18 is an interface for communicating with other equipment such as the simulator 20 and the like, and uses standards such as, for example, Ethernet®, FDDI, Wi-Fi®, or the like.

Functional structures of the robot control model learning device 10 are described next.

Figure 3:
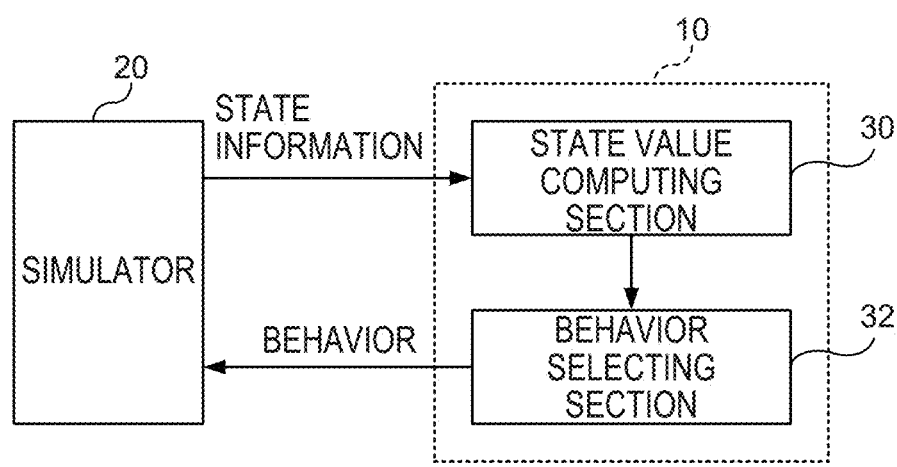
FIG. 3 is a block drawing illustrating functional structures of the robot control model learning device.

FIG. 3 is a block drawing illustrating an example of the functional structures of the robot control model learning device 10.

As illustrated in FIG. 3, the robot control model learning device 10 has a state value computing section 30 and a behavior selecting section 32 as functional structures thereof. The respective functional structures are realized by the CPU 11 reading-out a robot control program that is stored in the storage 14, and expanding and executing the program in the RAM 13. Note that the state value computing section 30 and the behavior selecting section 32 are examples of the learning section.

The present embodiment describes a case in which a state value function that is described later is learned by value-based deep reinforcement learning.

Figure 4:
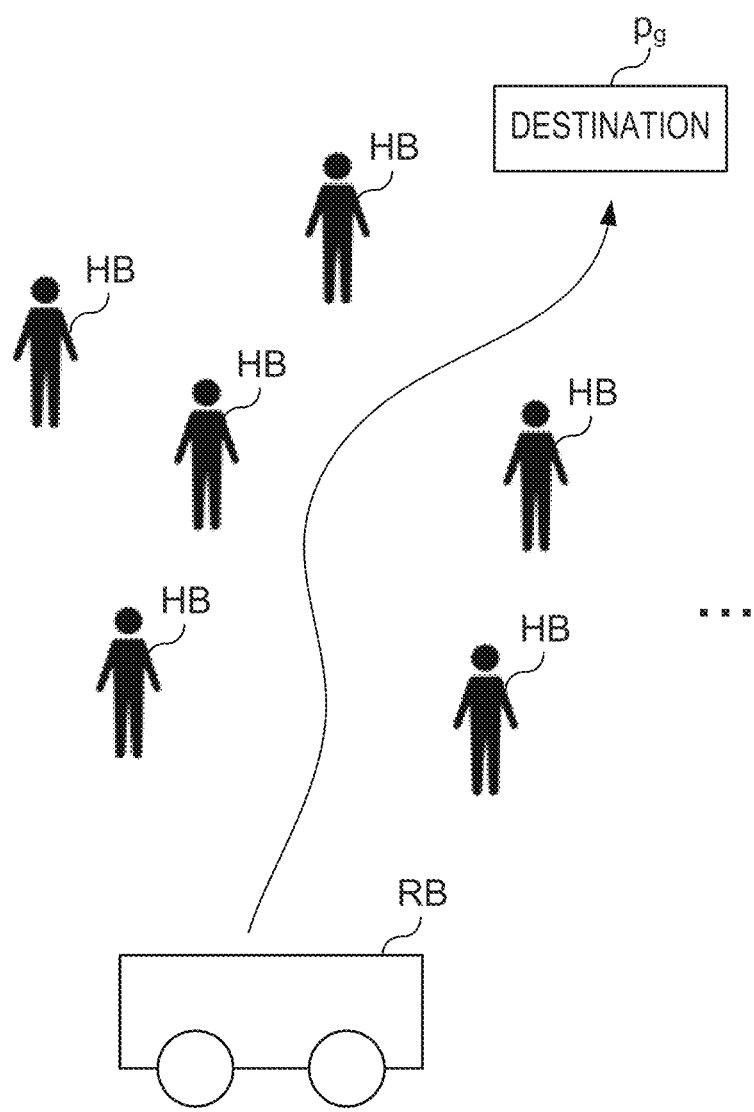
FIG. 4 is a drawing illustrating a situation in which a robot moves within a crowd to a destination.

The state value computing section 30 acquires state information from the simulator 20. The simulator 20 has the function of, in a case in which an autonomously traveling robot RB moves to destination $p_g$, simulating a dynamic environment that includes moving objects such as humans HB or the like that exist at the periphery of the robot RB, as shown in FIG. 4 for example. The simulator 20 outputs state information, which relates to the state of the robot RB and the peripheral environment of the robot RB, to the state value computing section 30.

Here, state information includes robot information relating to the state of the robot RB, environment information relating to the peripheral environment of the robot RB, and destination information relating to the destination that the robot RB is to reach.

The robot information includes information of the position and the velocity of the robot RB. In the present embodiment, velocity v of the robot RB is expressed by a vector in a two-dimensional coordinate system as follows.

$$v = \{v_x, v_y\}$$

Further, in the present embodiment, position p of the robot RB is expressed by coordinates in a two-dimensional coordinate system as follows.

$$p = \{p_x, p_y\}$$

In the present embodiment, state $s_t$ of the robot RB at time t is expressed as follows.

$$s_t = \{p_x, p_y, v_x, v_y, r_b\}$$

Here, $r_b$ expresses the radius of influence of the robot RB. As described later, the radius of influence $r_b$ is used at the time of judging whether or not the robot RB and another object other than the robot RB have collided.

The environment information is information relating to the dynamic environment, and specifically includes, for example, information of the positions and velocities of the moving objects such as the humans HB and the like that exist at the periphery of the robot RB. The present embodiment describes a case in which the environment information is information relating to the humans HB.

In the present embodiment, as illustrated in FIG. 4, states $s_t$ of the humans HB at the periphery of the robot RB are expressed as follows. Note that in the present embodiment, for convenience, in the formulas and the like, there are cases in which the symbols "˜(tilde)" and "ˆ (hat)" are added above the characters, and there are cases in which these symbols are added before the characters.

$$\tilde{s}_t = \{\tilde{s}_t^1, \tilde{s}_t^2, \ldots \tilde{s}_t^N\}$$

Here, N is the number of the humans HB existing at the periphery. Further, $\tilde{s}_t^1, \tilde{s}_t^2, \ldots \tilde{s}_t^N$ express the states of the respective humans HB at time t, i.e., the positions and velocities thereof.

Further, in the present embodiment, state $s_t^{in}$, which joins the state $s_t$ of the robot RB and the states $\tilde{s}_t$ of the humans HB existing at the periphery of the robot RB at time t, is expressed as follows.

$$s_t^{in} = \{s_t, \tilde{s}_t\}$$

The destination information includes position information of the destination $p_g$. Position $p_g$ of the destination is expressed by coordinates in a two-dimensional coordinate system as follows.

$$p_g = \{p_gx, p_gy\}$$

On the basis of the acquired state information, the state value computing section 30 computes reward r by using reward function $R(s^{in}, a)$. Here, a represents the behavior, and includes at least one of moving direction, moving velocity, an intervention behavior, and an avoidance behavior of the robot RB. Further, reward r is given such that the arrival time period until the robot RB reaches the destination $p_g$, the number of times of intervention that is the number of times that an intervention behavior is executed, and the number of times of avoidance in which the robot RB avoids a collision, become smaller.

Here, an intervention behavior is the behavior of notifying the humans HB, who are at the periphery, of the existence of the robot RB in order for the robot RB to move without stopping. Specifically, an intervention behavior is a behavior such as voice output of a message such as "move out of the way" or the like, or the issuing of a warning noise, or the like, but intervention behaviors are not limited to these. Further, an avoidance behavior is a behavior by which the robot RB avoids a collision with another object, and means the behavior of moving in a direction and at a velocity by which other objects can be avoided.

In the present embodiment, the reward function $R(s^{in}, a)$ is set as follows. Note that, hereinafter, there are cases in which the reward function $R(s^{in}, a)$ is simply called the reward function R.

$$R(s^{in}, a) = \alpha r_e + \beta r_c$$

Here, $r_e$ is the reward obtained from the environment, and $r_c$ is the influence reward due to the intervention. Further, a is the weight of the reward $r_e$, and $\beta$ is the weight of the reward $r_c$, and both are set to arbitrary values. The reward re and the reward re are expressed as follows.

$$r_e = \begin{cases} \epsilon_c & \text{if } d < 0 \\ \epsilon_g & \text{else if } p = p_g \\ 0 & \text{otherwise} \end{cases}$$

$$r_c = \begin{cases} \epsilon_b & \text{if } b_t \neq 0 \\ 0 & \text{otherwise} \end{cases}$$

Here, d is the distance that is used in order to judge whether or not the robot RB and the human HB will collide, and is expressed by the following formula.

$$d = D - (r_b + r_h)$$

D represents the distance between the robot RB and the human HB. $r_b$ is the aforementioned radius of influence of the robot RB, and $r_h$ is the radius of influence of the human HB. Note that $r_b$ and $r_h$ may be such that $r_b = r_h$, or may be such that $r_b \neq r_h$. A case in which d is less than 0 expresses a state in which the region within the radius of influence $r_b$ of the robot RB and the region within the radius of influence $r_h$ of the human HB partially overlap, i.e., a state in which the robot RB and the human HB are close. In the present embodiment, in a case in which d is less than 0, it is considered that the robot RB and the human HB have collided.

Further, $b_t$ is an intervention parameter that expresses whether or not the robot RB has carried out an intervention behavior with respect to the peripheral environment at time t. A case in which the intervention parameter $b_t$ is "0" expresses that an intervention behavior has not been carried out. On the other hand, a case in which the intervention parameter $b_t$ is a value other "0" expresses that the robot RB has carried out an intervention behavior.

In a case in which the distance d is less than 0, i.e., in a case in which it is considered that the robot RB and the human HB have collided, as described above, the reward $r_e$ is "$\varepsilon_c$".

Further, when the position p of the robot RB reaches the destination $p_g$, the reward $r_e$ is "$\varepsilon_g$". Here, the range of values that $\varepsilon_g$ can assume is $0 \le \varepsilon_g \le 1$. Further, the reward $\varepsilon_g$ is given such that, the later the arrival time until the destination $p_g$ is reached, the smaller the value thereof, i.e., the more the value thereof approaches "0". Further, the reward $\varepsilon_g$ is given such that, the earlier the arrival time until the destination $p_g$ is reached, the larger the value thereof, i.e., the more the value thereof approaches "1".

Further, in cases other than those described above, the reward $r_e$ is "0".

Further, in cases in which the intervention parameter $b_t$ is a value other than "0", the reward $r_e$ is "$\varepsilon_b$". Namely, $\varepsilon_b$ can be called a reward that relates to an intervention behavior. Further, in a case in which the intervention parameter $b_t$ is "0", the reward $r_e$ is "0".

Here, $\varepsilon_c$, $\varepsilon_b$ are set to values that are less than 0, i.e., to negative values, as negative rewards. Namely, $\varepsilon_c$ can be called a reward relating to collision avoidance, and $\varepsilon_b$ can be called a reward relating to an intervention behavior. Note that $\varepsilon_c$ may be expressed as a function of the distance d. Further, $\varepsilon_b$ may be expressed as a function of the intervention parameter $b_t$.

Further, the state value computing section 30 computes value $y_t$ of the state at time t by the following formula that uses state value function $V(s_t^{in})$.

$$y_t = r_t + \gamma^{\Delta t} V(s_{t+1}^{jn}) \quad (1)$$

Here, $r_t$ is the reward at time t that is computed by the reward function R. Further, $\Delta t$ is the increase in time in one step. Further, $\gamma$ is the discount factor of the reward, and is defined as follows.

$\gamma \in (0,1)$

Namely, the discount factor $\gamma$ can assume values that are greater than or equal to 0 and less than or equal to 1. Further, the discount factor $\gamma$ is set to a value that is such that, the further ahead in the future a reward is obtained, the more that reward is evaluated to be discounted.

The state value function $V(s_t^{in})$ is, in a policy selected by using policy function $\pi$ described later, a function that expresses the value of the robot RB and the humans HB at the periphery thereof being in the state $s_t^{in}$, and is expressed by the following formula. Here, "*" expresses optimality, and V* expresses the optimal state value function, and π* expresses the optimal policy function. Note that, hereinafter, there are cases in which the state value function $V(s_t^{in})$ is simply called the state value function V.

$$V^\wedge(s_t^{jn}) = \sum_{t'=t}^{T} \gamma^{t'} R_{t'}(s_{t'}^{jn}, \pi'(s_{t'}^{jn})) \quad (2)$$

Above formula (2) shows that the state value function $V(s_t^{in})$ is the sum of discounted cumulative rewards, which is the accumulation of rewards that will be obtained in the future and that have been discounted by the discount factor $\gamma$, i.e., that the state value function $V(s_t^{in})$ is the expected reward. In the present embodiment, the state value function V is approximated by using a deep neural network (value network). Hereinafter, the deep neural network that expresses the state value function V is called the V network.

The state value computing section 30 learns the V network. In the present embodiment, as an example, the V network is learned by a gradient descent method using an experience reply buffer. Namely, the states $s_t^{in}$ and the values $y_t$ are stored in buffer E, and a pair of the state $s_t^{in}$ and the value $y_t$ is read-out randomly from the buffer E, and the V network is learned by using the read-out pair as training data. Namely, the parameters of the V network are updated.

On the basis of the value of the state that is computed by the state value computing section 30, the behavior selecting section 32 selects behavior at that the robot RB is to perform. The behavior at is selected by using the policy function $\pi(s_t^{in})$ expressed by following formula (3). Note that, hereinafter, there are cases in which the policy function $\pi(s_t^{in})$ is simply called the policy function $\pi$.

$$\pi'(s_t^{in}) = \underset{a_t}{\operatorname{argmax}} R(s_t^{jn}, a_t) + \gamma^{\Delta t} \int_{s_{t+\Delta t}^{jn}} P(s_t^{jn}, s_{t+\Delta t}^{jn}|a_t) V^\wedge(s_{t+\Delta t}^{jn}) ds_{t+\Delta t}^{jn} \quad (3)$$

Here, $P(s_t^{in}, s_{t+\Delta t}^{in}|a_t)$ represents the state in a case of selecting the behavior $a_t$.

The behavior selecting section 32 outputs, to the simulator 20, the behavior $a_t$ that is selected by the policy function $\pi(s_t^{in})$. Due thereto, the simulator 20 causes the robot RB to execute the behavior $a_t$ in a simulation. For example, in a case in which the behavior $a_t$ is movement in moving direction $m_t$ and $a_t$ moving velocity $v_t$, the simulator 20 makes the robot RB move in the moving direction $m_t$ and at the moving velocity $v_t$ in the simulation. Further, in a case in which the behavior $a_t$ is an intervention behavior, the simulator 20 simulates avoidance behaviors that the humans HB at the periphery can take in a case in which a message such as "move out of the way" or the like is outputted by voice, or a warning noise is issued, or the like. Due to the robot RB executing the behavior $a_t$ in this way, the state $s_t$ of the robot RB and also the states $\tilde{s}_t$ of the humans HB at the periphery change. Further, the V network is learned, for the state after the change and in the same way as described above, by repeating the processings of computing the reward r, computing the state value V, selecting and executing the behavior a, and updating the parameters of the V network.

In this way, the robot control model learning device 10 can be called a robot control model that, functionally, uses state information as the inputs, and selects and outputs behavior corresponding to the inputted state information.

Operation of the robot control model learning device 10 is described next.

Figure 5:
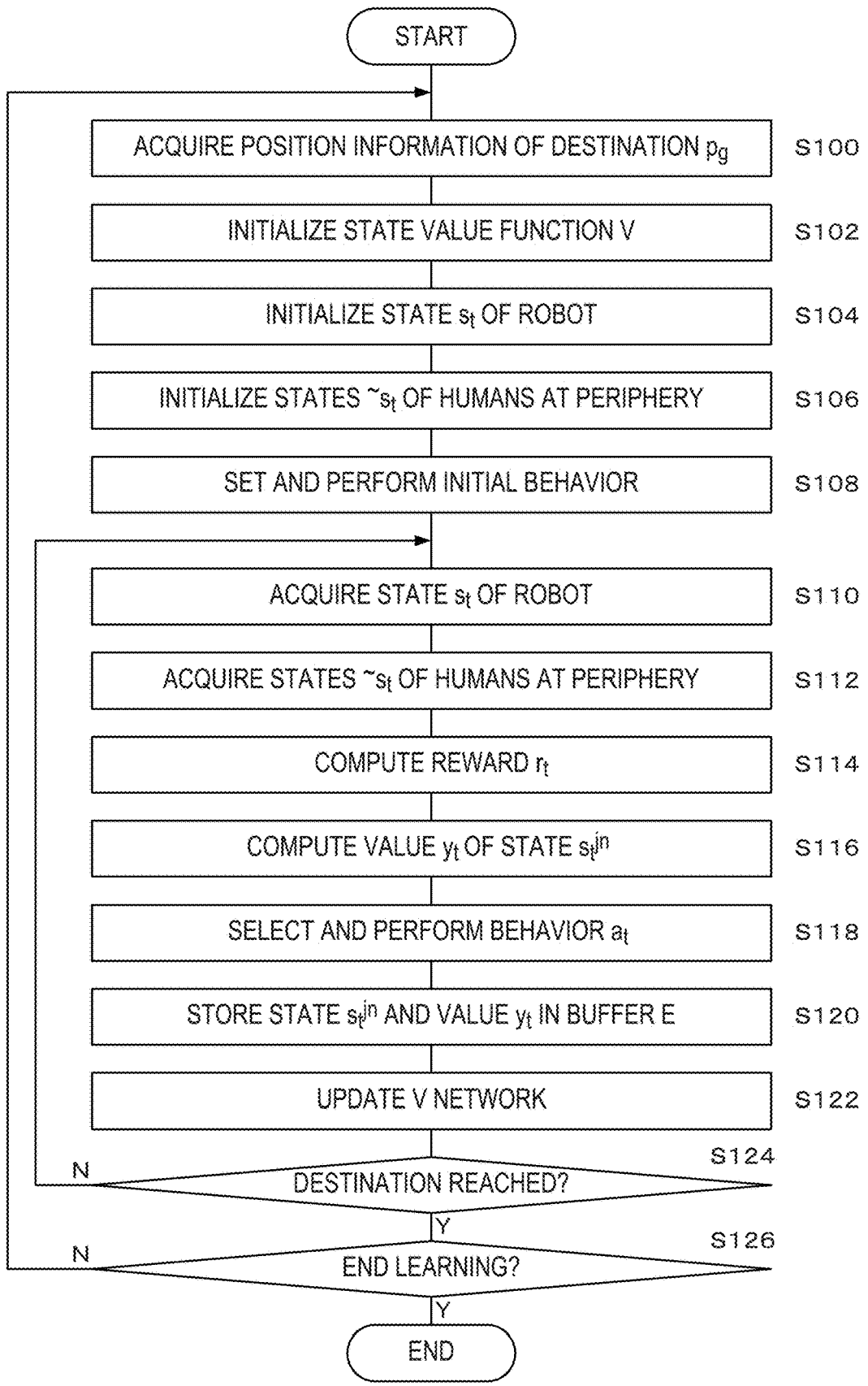
FIG. 5 is a flowchart illustrating the flow of robot control model learning processing by the robot control model learning device.

FIG. 5 is a flowchart illustrating the flow of robot control model learning processing by the robot control model learning device 10. The robot control model learning processing is carried out due to the CPU 11 reading-out the robot control model learning program from the storage 14, and expanding and executing the program in the RAM 13.

In step S100, as the state value computing section 30, the CPU 11 acquires position information of the destination $p_g$ from the simulator 20.

In step S102, as the state value computing section 30, the CPU 11 initializes the state value function V. Namely, the CPU 11 initializes the parameters of the V network.

In step S104, as the state value computing section 30, the CPU 11 initializes the state $s_t$ of the robot RB.

In step S106, as the state value computing section 30, the CPU 11 initializes the states $\tilde{s}_t$ of the humans HB at the periphery.

In step S108, as the behavior selecting section 32, the CPU 11 sets the behavior a that the robot RB will initially perform, and, by outputting the set behavior a to the simulator 20, causes the robot to perform behavior a. Due thereto, the simulator 20 executes behavior a in the simulation.

In step S110, as the state value computing section 30, the CPU 11 acquires the state $s_t$ of the robot RB from the simulator 20.

In step S112, as the state value computing section 30, the CPU 11 acquires the states $\tilde{s}_t$ of the humans HB at the periphery from the simulator 20.

In step S114, as the state value computing section 30, the CPU 11 computes the reward $r_t$ from the reward function R, on the basis of the states $s_t^{in}$ of the robot RB and the humans HB at the periphery that were acquired from the simulator 20, and the behavior $a_t$.

In step S116, as the state value computing section 30, the CPU 11 computes value $y_t$ of the state from above formula (1).

In step S118, as the behavior selecting section 32, the CPU 11 selects behavior $a_t$ from above formula (3), and outputs the selected behavior $a_t$ to the simulator 20. Due thereto, the simulator 20 causes the robot RB to execute the behavior $a_t$ in the simulation.

In step S120, as the state value computing section 30, the CPU 11 stores the state $s_t^{in}$ of the robot RB and the state value $y_t$ as a pair in the buffer E.

In step S122, as the state value computing section 30, the CPU 11 updates the parameters of the V network. Namely, the CPU 11 learns the V network. At this time, a past state $s^{in}$ and state value y that are stored in the buffer E are selected randomly, and the parameters of the V network are updated by using these as training data. Namely, the parameters of the V network are updated by using the gradient descent method in reinforcement learning. Note that the processing of step S122 may be executed once each plural times, and not executed each time.

In step S124, as the state value computing section 30, the CPU 11 judges whether or not the robot RB has arrived at the destination $p_g$. Namely, the CPU 11 judges whether or not the position p of the robot RB coincides with the destination $p_g$. Further, in a case in which it is judged that the robot RB has reached the destination $p_g$, the routine moves on to step S126. On the other hand, in a case in which it is judged that the robot RB has not reached the destination $p_g$, the routine moves on to step S110, and the processings of steps S110~S124 are repeated until it is judged that the robot RB has reached the destination $p_g$. Namely, the V network is learned. Note that the processings of steps S110~S124 are an example of the learning step.

In step S126, as the state value computing section 30, the CPU 11 judges whether or not an end condition that ends the learning is satisfied. In the present embodiment, the end condition is a case in which a predetermined number of (e.g., 100) episodes has ended, with one episode being, for example, the robot RB having arrived at the destination $p_g$ from the starting point. In a case in which it is judged that the end condition is satisfied, the CPU 11 ends the present routine. On the other hand, in a case in which the end condition is not satisfied, the routine moves on to step S100, and the destination $p_g$ is changed, and the processings of steps S100~S126 are repeated until the end condition is satisfied.

As described above, in the present embodiment, the reward $r_t$ that is computed by the reward function R includes reward $\varepsilon_c$ relating to collision avoidance and reward $\varepsilon_b$ relating to intervention behavior, and these assume negative values as negative rewards. By learning the V network by using such a reward function R, the number of times of intervention, in which the robot RB performs an intervention behavior, and the number of times of collision avoidance can be reduced. Due thereto, the time until the robot RB reaches the destination $p_g$ can be shortened, while the stress that is applied to the peripheral environment is reduced.

The robot RB, which is controlled by the robot control model learned by the robot control model learning device 10, is described next.

Figure 6:
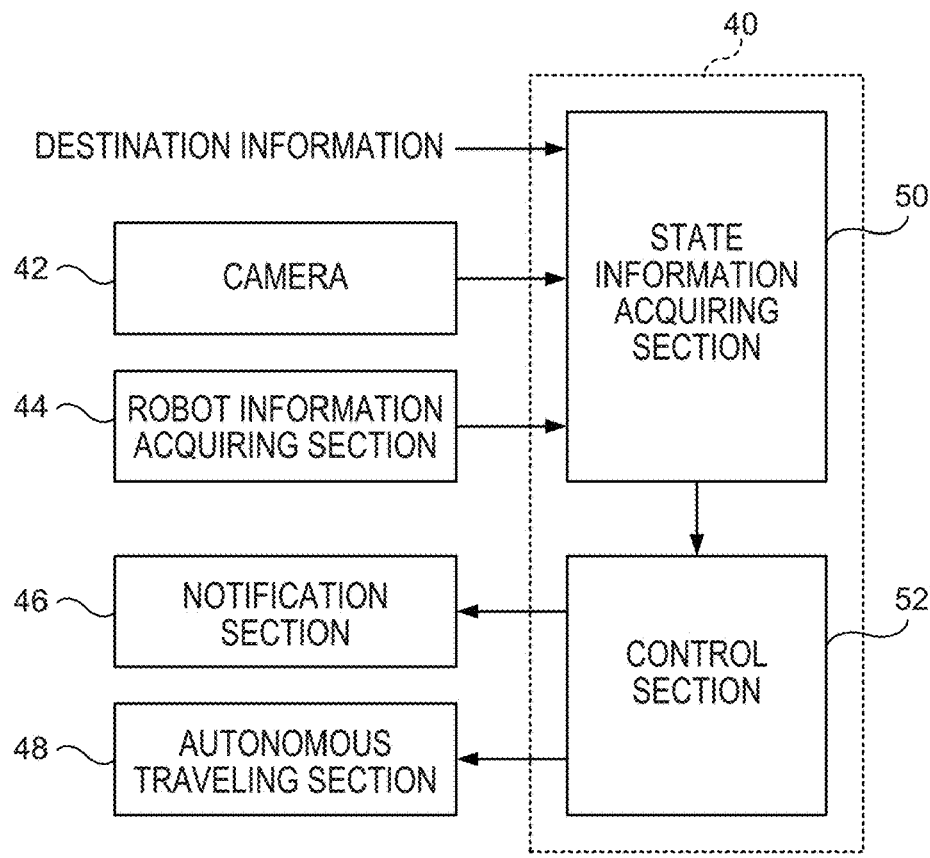
FIG. 6 is a block drawing illustrating functional structures of a robot control device.

The schematic structure of the robot RB is illustrated in FIG. 6. As illustrated in FIG. 6, the robot RB has a robot control device 40, a camera 42, a robot information acquiring section 44, a notification section 46 and an autonomous traveling section 48. The robot control device 40 has a state information acquiring section 50 and a control section 52.

The camera 42 captures images of the periphery of the robot RB at a predetermined interval while the robot RB moves from the starting point to the destination $p_g$, and outputs the captured local images to the state information acquiring section 50 of the robot control device 40.

The robot information acquiring section 44 acquires the state $s_t$ of the robot RB. Namely, the position and the velocity of the robot RB are acquired. Specifically, for example, the position p of the robot RB may be acquired by using a GPS (Global Positioning System) device, or may be acquired by using a known self-position estimating technique such as SLAM (Simultaneous Localization and Mapping) or the like. Further, the velocity of the robot RB is acquired by using a speed sensor for example.

The robot information acquiring section 44 outputs the acquired state $s_t$ of the robot RB to the state information acquiring section 50.

On the basis of captured images that are captured by the camera 42, the state information acquiring section 50 acquire the states $\tilde{s}_t$ of the humans HB. Specifically, the captured images are analyzed by using a known method, and the positions and the velocities of the humans HB existing at the periphery of the robot RB are computed.

Further, destination information is inputted to the state information acquiring section 50 by communication from an external device for example.

The state information acquiring section 50 outputs the acquired destination information, state $s_t$ of the robot RB, and states $\tilde{s}_t$ of the humans HB to the control section 52.

The control section 52 has the function of the robot control model learned by the robot control model learning device 10. Namely, the control section 52 has the functions of the state value computing section 30 after having learned the V network, and the behavior selecting section 32.

The control section 52 selects a behavior corresponding to the inputted state information, and, on the basis of the selected behavior, controls at least one of the notification section 46 and the autonomous traveling section 48.

The notification section 46 has the function of notifying the humans HB, who are at the periphery, of the existence of the robot RB by outputting a voice or outputting a warning sound.

The autonomous traveling section 48 has the function of causing the robot RB, such as the tires and a motor that drives the tires and the like, to travel autonomously.

In a case in which the selected behavior is a behavior of making the robot RB move in an indicated direction and at an indicated velocity, the control section 52 controls the autonomous traveling section 48 such that the robot RB moves in the indicated direction and at the indicated velocity.

Further, in a case in which the selected behavior is an intervention behavior, the control section 52 controls the notification section 46 to output a voice message such as "move out of the way" or the like, or to emit a warning sound.

Hardware structures of the robot control device 40 are described next.

Figure 7:
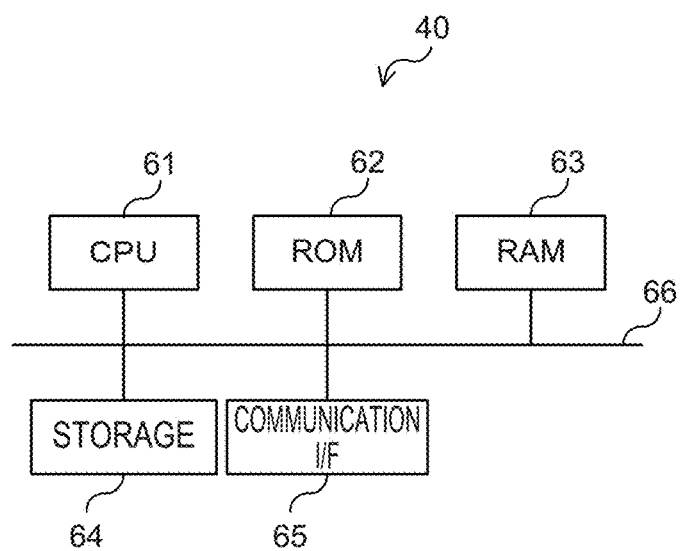
FIG. 7 is a block drawing illustrating hardware structures of the robot control device.

As illustrated in FIG. 7, the robot control device 40 has a CPU (Central Processing Unit) 61, a ROM (Read Only Memory) 62, a RAM (Random Access Memory) 63, a storage 64 and a communication interface 65. The respective structures are connected so as to be able to communicate with one another via a bus 66.

In the present embodiment, the robot control program is stored in the storage 64. The CPU 61 is a central computing processing unit, and executes various programs and controls the respective structures. Namely, the CPU 61 reads-out a program from the storage 64, and executes the program by using the RAM 63 as a workspace. The CPU 61 caries out control of the above-described respective structures, and various computing processings, in accordance with the programs recorded in the storage 64.

The ROM 62 stores various programs and various data. The RAM 63 temporarily stores programs and data as a workspace. The storage 64 is structured by an HDD (Hard Disk Drive) or an SSD (Solid State Drive), and stores various programs, including the operating system, and various data.

The communication interface 65 is an interface for communicating with other equipment, and uses standards such as, for example, Ethernet®, FDDI, Wi-Fi®, or the like.

Operation of the robot control device 40 is described next.

FIG. 8 is a flowchart illustrating the flow of robot controlling processing by the robot control device 40. The robot controlling processing is carried out due to the CPU 61 reading-out the robot control program from the storage 64, and expanding and executing the program in the RAM 63.

In step S200, as the state information acquiring section 50, the CPU 61 acquires position information of the destination $p_g$ by wireless communication from, for example, an unillustrated external device.

In step S202, as the state information acquiring section 50, the CPU 61 acquires the state $s_t$ of the robot RB from the robot information acquiring section 44.

In step S204, as the state value computing section 30, the CPU 61 acquires the states $\tilde{s}_t$ of the humans HB at the periphery on the basis of the captured images captured by the camera 42.

In step S206, as the control section 52, the CPU 61 computes the reward $r_t$ from the reward function R on the basis of the states sea of the robot RB and the humans HB at the periphery that were acquired from the state information acquiring section 50, and the behavior $a_t$.

In step S208, as the control section 52, the CPU 61 computes value $y_t$ of the state from above formula (1).

In step S210, as the control section 52, the CPU 61 selects behavior $a_t$ from above formula (3), and controls at least one of the notification section 46 and the autonomous traveling section 48 on the basis of the selected behavior $a_t$. Due thereto, the robot RB executes the behavior $a_t$.

In step S212, as the control section 52, the CPU 61 judges whether or not the robot RB has arrived at the destination $p_g$. Namely, the CPU 61 judges whether or not the position p of the robot RB coincides with the destination $p_g$. Then, if it is judged that the robot RB has reached the destination $p_g$, the present routine ends. On the other hand, if it is judged that the robot RB has not reached the destination $p_g$, the routine moves on to step S202, and repeats the processings of steps S202~S212 until it is judged that the robot RB has reached the destination $p_g$. Note that the processings of steps S202~S212 are examples of the controlling step.

In this way, in the present embodiment, the robot RB is controlled on the basis of the robot control model that is learned by the robot control model learning device 10. Due thereto, the number of times of intervention, in which the robot RB performs an intervention behavior, and the number of times of collision avoidance can be reduced. Accordingly, the time until the robot RB reaches the destination $p_g$ can be shortened, while the stress that is applied to the peripheral environment is reduced.

Note that, although the present embodiment describes a case of learning the state value function V, the learning method is not limited to this. For example, instead of learning the state value function V, a behavior value function Q ($s^{in}$, a) that computes a behavior value of the robot RB may be learned.

Further, although the present embodiment describes a case in which the reward $\varepsilon_c$ that relates to collision avoidance and the reward $\varepsilon_b$ that relates to an intervention behavior are included as the rewards that the reward function R outputs, the function may be made such that the reward $\varepsilon_c$ that relates to collision avoidance is not included therein.

Further, in the present embodiment, a structure in which the robot RB has the camera 42 is described, but the technique of the present disclosure is not limited to this. For example, the camera 42 may be omitted, and bird's-eye view images of looking down on the robot RB may be acquired from an external device, and the states $\tilde{s}_t$ of the humans HB at the periphery of the robot RB may be acquired by analyzing the acquired bird's-eye view images.

Further, although the present embodiment describes a case in which the robot RB has the robot control device 40, the function of the robot control device 40 may be provided at an external server. In this case, the robot RB transmits the captured images captured at the camera 42 and the robot information acquired at the robot information acquiring section 44 to the external server, and the robot RB performs the behavior that is instructed by the external server.

Note that any of various types of processors other than a CPU may execute the robot controlling processing that is executed due to the CPU reading software (a program) in the above-described embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the robot control model learning processing and the robot controlling processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above-described respective embodiments describe forms in which the robot control model learning program is stored in advance in the storage 14, and the robot control program is stored in advance in the storage 64, but the present disclosure is not limited to this. The programs may be provided in a form of being recorded on a recording medium such as a CD-ROM (Compact Disc Read Only Memory), a DVD-ROM (Digital Versatile Disc Read Only Memory), a USB (Universal Serial Bus) memory, or the like. Further, the programs may in a form of being downloaded from an external device over a network.

All publications, patent applications, and technical standards mentioned in the present specification are incorporated by reference into the present specification to the same extent as if such individual publication, patent application, or technical standard was specifically and individually indicated to be incorporated by reference.

EXPLANATION OF REFERENCE NUMERALS 10 robot control model learning device
20 simulator
30 state value computing section
32 behavior selecting section
40 robot control device
42 camera
44 robot information acquiring section
46 notification section
48 autonomous traveling section
50 state information acquiring section
52 control section
HB human
RB robot

The invention claimed is:

1. A robot control model learning method, comprising, by a computer:
subjecting a robot control model to reinforcement learning, the robot control model being input with state information expressing a state of a robot that travels autonomously to a destination in a dynamic environment, and the robot control model selecting and outputting a behavior corresponding to the state of the robot from among a plurality of behaviors, wherein:
the plurality of behaviors include an intervention behavior of intervening in the dynamic environment,
the intervention behavior is a non-moving behavior of the robot to notify someone of an existence of the robot in order for the robot to travel to the destination without stopping,
the reinforcement learning is performed on the robot control model using a reward function,
the reward function includes a weighted combination of an environment reward and an influence reward,
the environment reward takes a first negative value when the robot collides with another object,
the influence reward takes a second negative value when the robot executes the intervention behavior, and
the reinforcement learning comprises:
learning a deep neural network representing a state value function,
determining the state of the robot based on: the reward function, a discount factor, an increase in time in one step, and the state value function, and
updating the state value function by updating parameters of the deep neural network.

2. The robot control model learning method of claim 1, wherein:
the plurality of behaviors include at least one of a moving direction of the robot, a moving velocity of the robot, or the intervention behavior, and
the reward function is given such that at least one of an arrival time until the robot reaches the destination or a number of times of intervention decreases.

3. The robot control model learning method of claim 1, wherein:
the plurality of behaviors include an avoidance behavior, which is a moving behavior of the robot to avoid collision with another object when travelling to the destination, and
the reward function is given such that a number of times of avoidance in which the collision is avoided decreases.

4. The robot control model learning method of claim 1, wherein:
the discount factor is set to a value between zero and one, and
a reward that is obtained at a later time is to be discounted more than a reward that is obtained at an earlier time, based on the discount factor and the increase in time in one step.

5. A robot control model learning device, comprising:
a learning section that includes a processor and a memory and subjects a robot control model to reinforcement learning, the robot control model being configured to receive state information expressing a state of a robot that travels autonomously to a destination in a dynamic environment, and to select and output a behavior corresponding to the state of the robot from among a plurality of behaviors, wherein:
the plurality of behaviors include an intervention behavior of intervening in the dynamic environment,
the intervention behavior is a non-moving behavior of the robot to notify someone of an existence of the robot in order for the robot to travel to the destination without stopping,
the reinforcement learning is performed on the robot control model using a reward function,
the reward function includes a weighted combination of an environment reward and an influence reward,
the environment reward takes a first negative value when the robot collides with another object,
the influence reward takes a second negative value when the robot executes the intervention behavior, and
the reinforcement learning comprises:
learning a deep neural network representing a state value function,
determining the state of the robot based on: the reward function, a discount factor, an increase in time in one step, and the state value function, and
updating the state value function by updating parameters of the deep neural network.

6. A non-transitory recording medium storing a robot control model learning program that is executable by a computer to perform processing, the processing comprising:
subjecting a robot control model to reinforcement learning, the robot control model being input with state information expressing a state of a robot that travels autonomously to a destination in a dynamic environment, and the robot control model selecting and outputting a behavior corresponding to the state of the robot from among a plurality of behaviors, wherein:
the plurality of behaviors include an intervention behavior of intervening in the dynamic environment,
the intervention behavior is a non-moving behavior of the robot to notify someone of an existence of the robot in order for the robot to travel to the destination without stopping,
the reinforcement learning is performed on the robot control model using a reward function,
the reward function includes a weighted combination of an environment reward and an influence reward,
the environment reward takes a first negative value when the robot collides with another object,
the influence reward takes a second negative value when the robot executes the intervention behavior, and
the reinforcement learning comprises:
learning a deep neural network representing a state value function,
determining the state of the robot based on: the reward function, a discount factor, an increase in time in one step, and the state value function, and
updating the state value function by updating parameters of the deep neural network.

7. A robot control method, according to which a computer performs processing, the processing comprising:
acquiring state information expressing a state of a robot that travels autonomously to a destination in a dynamic environment; and
effecting control such that the robot moves to the destination on the basis of the state information and on the basis of the robot control model learned by the robot control model learning method of claim 1.

8. A robot control device, comprising:
an acquisition section that is implemented on a processor and a memory and acquires state information expressing a state of a robot that travels autonomously to a destination in a dynamic environment; and
a control section that is implemented on a processor and a memory and effects control such that the robot moves to the destination on the basis of the state information and on the basis of the robot control model learned by the robot control model learning device of claim 5.

9. A non-transitory recording medium storing a robot control program that is executable by a computer to perform processing, the processing comprising:
acquiring state information expressing a state of a robot that travels autonomously to a destination in a dynamic environment; and
effecting control such that the robot moves to the destination on the basis of the state information and on the basis of the robot control model learned by the robot control model learning method of claim 1.

10. A robot, comprising:
an acquisition section that is implemented on a processor and a memory and acquires state information expressing a state of the robot, which travels autonomously to a destination in a dynamic environment;
an autonomous traveling section that includes a motor and causes the robot to travel autonomously; and
a robot control device that includes a control section implemented on a processor and a memory and configured to effect control such that the robot moves to the destination on the basis of the state information and on the basis of the robot control model learned by the robot control model learning device of claim 5.

11. A robot control method, according to which a computer performs processing, the processing comprising:
acquiring state information expressing a state of a robot that travels autonomously to a destination in a dynamic environment; and
effecting control such that the robot moves to the destination on the basis of the state information and on the basis of the robot control model learned by the robot control model learning method of claim 2.

12. A robot control method, according to which a computer performs processing, the processing comprising:
acquiring state information expressing a state of a robot that travels autonomously to a destination in a dynamic environment; and
effecting control such that the robot moves to the destination on the basis of the state information and on the basis of the robot control model learned by the robot control model learning method of claim 3.

13. A robot control method, according to which a computer performs processing, the processing comprising:
acquiring state information expressing a state of a robot that travels autonomously to a destination in a dynamic environment; and
effecting control such that the robot moves to the destination on the basis of the state information and on the basis of the robot control model learned by the robot control model learning method of claim 1.

14. A non-transitory recording medium storing a robot control program that is executable by a computer to perform processing, the processing comprising:
acquiring state information expressing a state of a robot that travels autonomously to a destination in a dynamic environment; and
effecting control such that the robot moves to the destination on the basis of the state information and on the basis of the robot control model learned by the robot control model learning method of claim 2.

15. A non-transitory recording medium storing a robot control program that is executable by a computer to perform processing, the processing comprising:
acquiring state information expressing a state of a robot that travels autonomously to a destination in a dynamic environment; and
effecting control such that the robot moves to the destination on the basis of the state information and on the basis of the robot control model learned by the robot control model learning method of claim 3.

16. A non-transitory recording medium storing a robot control program that is executable by a computer to perform processing, the processing comprising:
acquiring state information expressing a state of a robot that travels autonomously to a destination in a dynamic environment; and
effecting control such that the robot moves to the destination on the basis of the state information and on the basis of the robot control model learned by the robot control model learning method of claim 1.

17. The robot control model learning device of claim 5, wherein:
the plurality of behaviors include at least one of a moving direction of the robot, a moving velocity of the robot, or the intervention behavior, and the reward function is given such that at least one of an arrival time until the robot reaches the destination or a number of times of intervention decreases.

18. The robot control model learning method of claim 5, wherein:
the plurality of behaviors include an avoidance behavior, which is a moving behavior of the robot to avoid a collision with another object when travelling to the destination, and
the reward function is given such that a number of times of avoidance in which the collision is avoided decreases.

19. The non-transitory recording medium of claim 6, wherein:
the plurality of behaviors include at least one of a moving direction of the robot, a moving velocity of the robot, or the intervention behavior, and
the reward function is given such that at least one of an arrival time until the robot reaches the destination or a number of times of intervention decreases.

20. The non-transitory recording medium of claim 6, wherein:
the plurality of behaviors include an avoidance behavior, which is a moving behavior of the robot to avoid a collision with another object when travelling to the destination, and
the reward function is given such that a number of times of avoidance in which the collision is avoided decreases.

* * * * *